No. 653,229. Patented July 10, 1900.
L. J. GAMBLE.
GAGE FOR USE WITH RULES.
(Application filed Feb. 10, 1900.)
(No Model.)
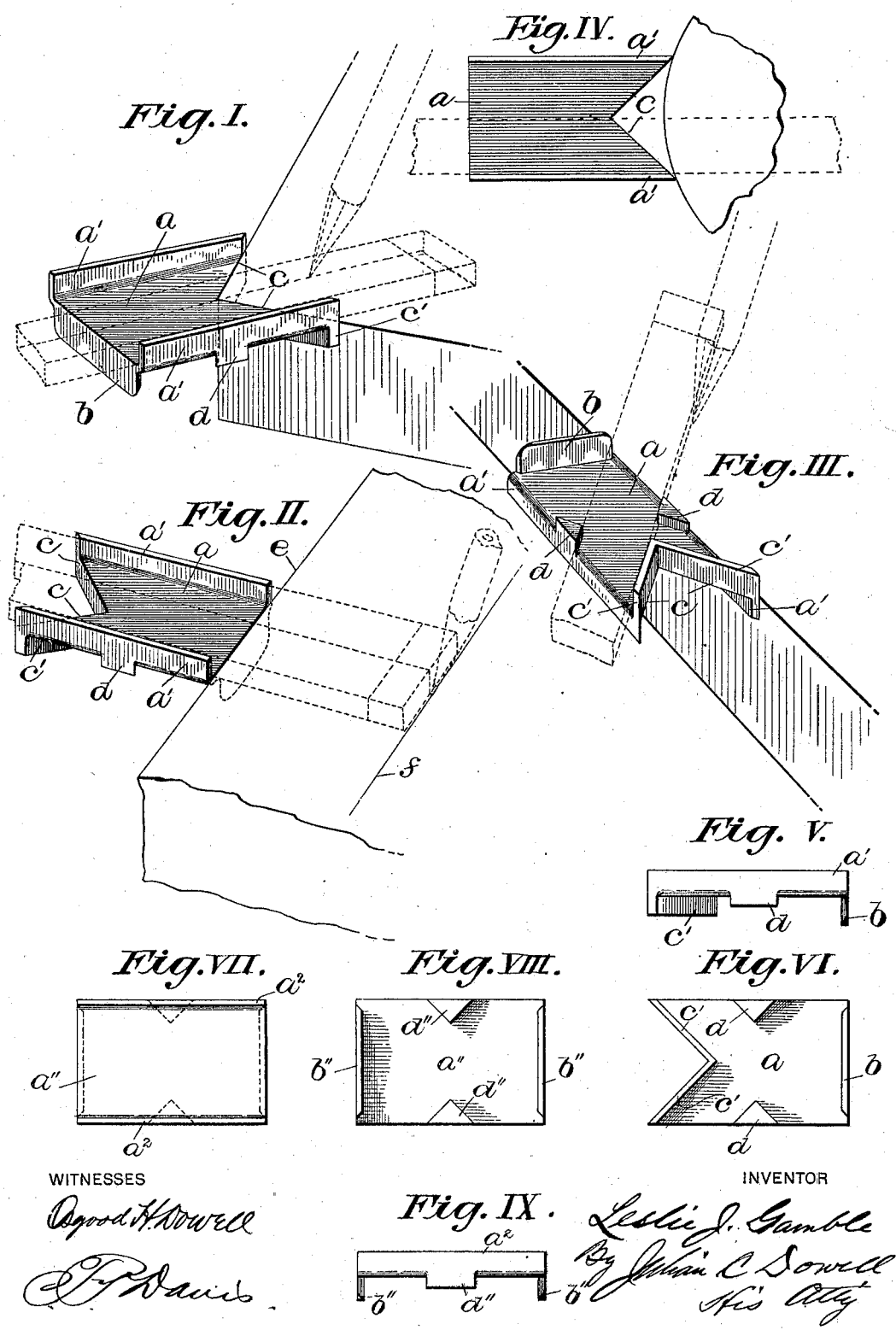
WITNESSES
INVENTOR
Leslie J. Gamble

United States Patent Office.

LESLIE J. GAMBLE, OF MOLINE, ILLINOIS.

GAGE FOR USE WITH RULES.

SPECIFICATION forming part of Letters Patent No. 653,229, dated July 10, 1900.

Application filed February 10, 1900. Serial No. 4,813. (No model.)

*To all whom it may concern:*

Be it known that I, LESLIE J. GAMBLE, a citizen of the United States, residing at Moline, in the county of Rock Island and State of Illinois, have invented certain new and useful Improvements in Appliances for Use with Two-Foot Rules; and I do hereby declare the following to be a full, clear, and exact description of the invention, such as will enable others skilled in the art to which it appertains to make and use the same.

The object of the present invention is to provide an appliance for use in conjunction with a two-foot rule whereby the latter may be utilized for accurately obtaining lines parallel with or at certain prescribed angles to a straight-edge and also lines accurately bisecting right angles or indicating diameters of circles.

The drawings which accompany and form part of this specification illustrate two forms in which the invention may be embodied.

Figures I, II, and III represent in perspective one form of the device, illustrating different uses thereof. Fig. IV represents said device in plan illustrating another use. Figs. V and VI show, respectively, side and face views of the same. Figs. VII and VIII show opposite face views of a somewhat-different form of device. Fig. IX shows a side elevation of the same.

In Figs. I to V the reference-letter $a$ designates a metal plate having parallel flanges $a'$ extending along its sides at right angles to it, the distance between the inner sides of the flanges equaling the width of two sections of a two-foot rule, as indicated by broken lines in Fig. II. A right-angle flange or lip $b$ extends along one end of the plate on the side opposite that from which the flanges $a'$ protrude, and at the opposite end the plate is formed with a notch whose edges $c$ extend at right angles to each other and are of equal length, so that their meeting-point is exactly at a median line of the plate. Flanges $c'$ are formed on the edges of the V-shaped notch, said flanges standing at right angles to the plate and protruding from the same side thereof as does the lip $b$. Located centrally of the side edges of the plate and opposite to each other are two projections or lugs $d$ on the same side of the plate as the lip $b$ and flanges $c'$ and of right-angle-triangle form, with the hypotenuse sides flush with the outer sides of the flanges $a'$.

In one use of the appliance above described the side flanges $a'$ constitute guides between which two sections of a two-foot rule are fitted with the lip $b$, engaging a straight-edge, as $e$ in Fig. II, and in sliding the device, together with the rule, along said edge the ends of the rule-sections will follow a line parallel with this edge. Hence by holding a marker against the end of the rule, as indicated in Fig. II, a line, as $f$, can be drawn parallel with said straight-edge at any desired distance from the latter within the compass of a rule. Of course in this use of the appliance only one section of the rule need be employed, the same being held against one of the side flanges $a'$. A single section of the rule is used in this way when the appliance is employed in such a manner as illustrated in Fig. I, where it is desired to bisect a right angle at a corner. The notched end of the plate is engaged with the corner, as shown, and the rule-section being just half as wide as the space between the side flanges of the plate it registers with the apex of the angle and when held against the side flange will provide a guide by which to draw a line bisecting the angle. In a similar way the diameter of a circle can be ascertained, as illustrated in Fig. IV.

Still another use of the device is illustrated in Fig. III, where one of the side flanges lies against a straight-edge, the plate being held flush with the surface to be marked and the triangular lugs serving as guides for the rule-section, holding the same at an angle of forty-five degrees to the straight-edge. It will be apparent that the reverse angle to that shown in this figure can be had by engaging the rule-section with other sides of the lugs. It is to be noted that in this use of the device the flanges $c'$ and the end edges of the lip $b$ come into play as guides for the rule-section.

The form of construction illustrated in Figs. VII to IX differs from that shown in the other figures in that the plate $a''$ is without the V-shaped notch and has a lip $b''$ at each end, the plate being of generally-rectangular form. Side flanges $a^2$ and triangular lugs $d''$ are provided as before, and the end edges of the lips serve as guides for the rule-section when the latter is engaged with the said lugs.

While the projections $d$ and $d''$ appear in the drawings as solid lugs, they may be formed by striking up portions of the plates. Other changes may be made in the details of construction without departing from the spirit and scope of the invention.

Having thus fully described my invention, what I claim as new, and desire to secure by Letters Patent of the United States, is—

1. A rule appliance comprising a plate having parallel flanges extending along the edges of one side thereof, oppositely-located triangular-shaped projections on the opposite side of the plate between its ends, a transverse lip or flange at one end on the same side as said projections, and a V-shaped notch at its opposite end, substantially as described.

2. A rule appliance comprising a plate having oppositely-located triangular-shaped projections on one side and an end flange on the same side as the said projections.

3. A rule appliance comprising a plate having oppositely-located triangular-shaped projections on one side and a notch at one end with flanges along its edges on the same side of the plate as the said projections.

4. A rule appliance comprising a plate having oppositely-located triangular-shaped projections on one side, and an end flange on the same side as the said projections, and parallel flanges extending along the edges thereof opposite and at right angles to said end flange, substantially as described.

5. A rule appliance comprising a plate having oppositely-located projections intermediate the ends thereof on one side, a notch at one end with flanges extending along the edges thereof, a transverse lip or flange at the opposite end of the plate on the same side as the said projections, and parallel flanges extending along the plate on the side thereof opposite the said projections and at right angles to said lip, substantially as described.

6. A rule appliance comprising a plate having parallel flanges on one side thereof, end flanges or lips on the opposite side thereof, and intermediate oppositely-located projections on the side thereof between said end flanges, substantially as described.

7. A rule appliance comprising a plate flanged along its sides and at the ends, the end flanges extending oppositely to the side flanges, and the plate having oppositely-located triangular-shaped projections on the side from which the end flanges protrude.

8. A rule appliance comprising a plate with parallel right-angle flanges along its sides, a lip at one end extending oppositely to said flanges, a notch at the other end with flanges along its sides protruding correspondingly with said lip, and oppositely-located triangular-shaped projections on the same side of the plate as the latter.

In testimony whereof I affix my signature in presence of two witnesses.

LESLIE J. GAMBLE.

Witnesses:
F. H. COOPER,
LYSTER J. CHAMBERS.